Feb. 12, 1952     R. D. FAGEOL     2,584,995
PRESSURE ACTUATED TRANSMISSION CONTROL UNIT
Filed April 12, 1949     2 SHEETS—SHEET 1

*INVENTOR.*
ROBLEY D. FAGEOL
BY
*E. J. Balluff*
ATTORNEY

Feb. 12, 1952   R. D. FAGEOL   2,584,995
PRESSURE ACTUATED TRANSMISSION CONTROL UNIT
Filed April 12, 1949   2 SHEETS—SHEET 2
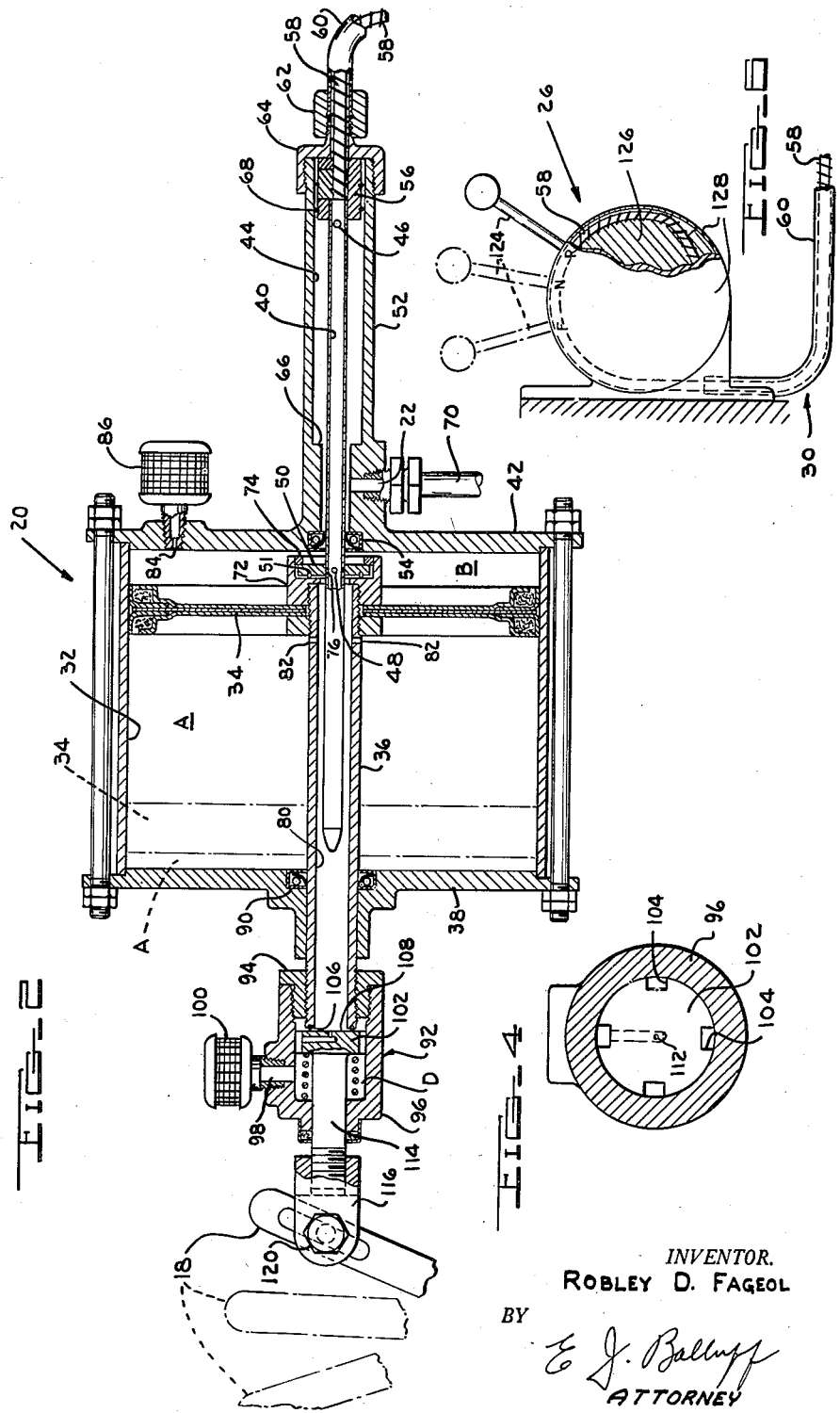
INVENTOR.
ROBLEY D. FAGEOL
BY
*E. J. Balluff*
ATTORNEY Patented Feb. 12, 1952

2,584,995

UNITED STATES PATENT OFFICE 2,584,995

PRESSURE ACTUATED TRANSMISSION CONTROL UNIT

Robley D. Fageol, Detroit, Mich., assignor to R. D. Fageol Company, Detroit, Mich., a corporation of Michigan Application April 12, 1949, Serial No. 87,000

9 Claims. (Cl. 121—41)

1

This invention relates to remote controlled power units and has particular reference to such a power unit which is constructed and arranged for shifting a marine transmission into and out of gear, although it is to be understood that the invention is not limited to the specific application illustrated.

This invention contemplates a remote controlled power unit for performing work, such for example as shifting the gears of a marine transmission into and out of their forward, neutral, and reverse positions, and for which there is provided an operator-manipulated control remotely positioned relative to the power unit and forming a means for controlling the energization thereof, the work required to be done by the operator in manipulating such control being merely that of shifting the control and not related to the amount of work done by the control unit. In addition, the power unit is constructed and arranged so that the length of the work stroke thereof may be accurately controlled by the operator.

Principal objects of the invention, therefore, are to provide:

A new and improved remote controlled power unit;

A remote controlled power unit in which the work stroke thereof may be accurately controlled by the operator; and A remote controlled power unit in which the manual control may be set to a selected position without being limited by the speed of the work stroke.

Other and further objects of the invention will be apparent from the following description and claims and will be understood by reference to the accompanying drawings, of which there are two sheets, which by way of illustration show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 2 is an enlarged longitudinal sectional view of the power unit;

2

Figure 3:
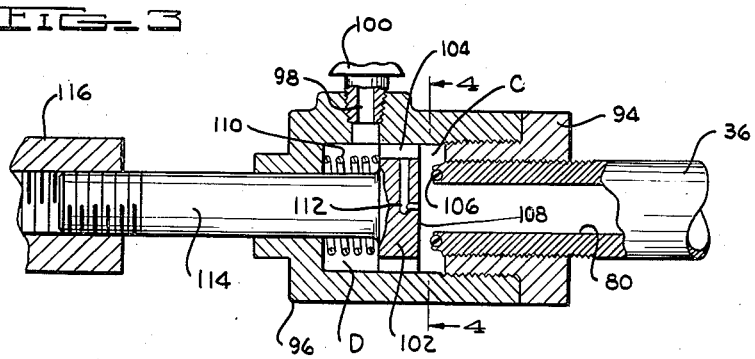
Figure 5:
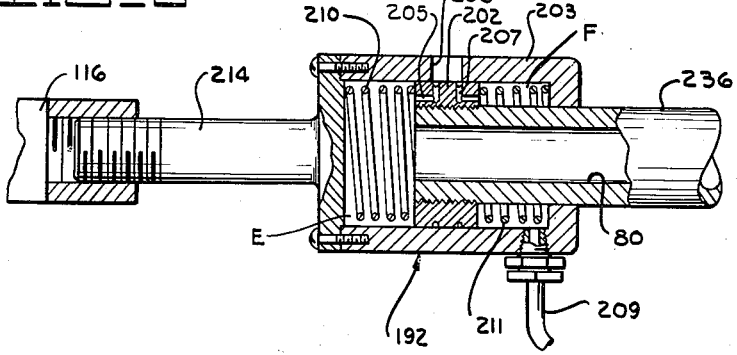

Fig. 3 is an enlarged sectional view of the bleed valve arrangement illustrated in Fig. 2;

Fig. 4 is a sectional view taken along the line 4—4 of Fig. 3;

Fig. 5 is a view similar to Fig. 3 and illustrating a modified form of bleed valve arrangement; and Fig. 6 is an enlarged view, partly broken away, of the operator-manipulated control for the power unit.

Figure 1:
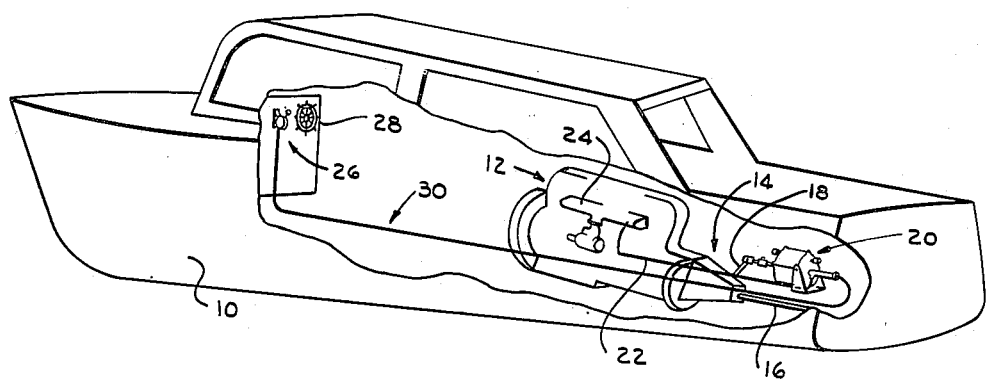
Fig. 1 is a schematic view illustrating the application of a device embodying my invention to a marine craft for operating the reverse gear thereof.

As illustrated in Fig. 1, a device embodying the invention is there illustrated in connection with a boat 10 having an internal combustion engine 12 and a transmission 14 commonly called a reverse gear. A drive or propeller shaft 16 is adapted to be driven by the engine 12 through the transmission 14, and a propeller (not shown) is connected to the shaft 16 for propelling the craft either forwardly or reversely. The transmission is provided with a shift lever 18 which may have the usual three positions, namely, forward, neutral and reverse, the shift lever 18 being shown in the reverse position. In the reverse position of the transmission 14 the transmission is arranged so that when the engine is operating, the craft will be propelled rearwardly. In the neutral position of the shift lever 18 the gearing of the transmission is arranged so that the engine may run without propelling the craft in either direction, and in the forward position of the transmission the gearing is arranged so that when the engine is operating, the craft will be propelled forwardly.

The power unit embodying my invention is indicated generally at 20 and comprises a cylinder and piston unit in which the piston thereof is connected to the shift lever 18 for shifting the same between its various positions. A suction conduit 22 communicates at one end with the induction manifold 24 of the engine 12 and at its other end with the power unit 20 so that suction in the manifold may be utilized to energize the power unit 20.

The operator-manipulated control indicated generally at 26 may be positioned adjacent the steering wheel 28 of the craft, and a positive two-way motion transmitting connection indicated generally at 30 connects the control 26 with the power unit 20 for controlling the energization thereof, more particularly for controlling the application of suction to the cylinder unit on either side of the piston thereof.

Referring now particularly to Figs. 2 and 3, the power unit comprises a cylinder 32 and piston member 34 arranged in the cylinder for reciprocal movement relative thereto between limit positions at each end of the cylinder 32. In full line position, as shown in Fig. 2, the piston 34 is at one of its limit positions which corresponds with the reverse position of the transmission. The dotted line position of the piston 34 indicated in Fig. 2 corresponds with the forward position of the transmission.

A hollow piston rod 36 is connected to the piston member 34 and projects through one end wall 38 of the cylinder 32. The piston rod 36 forms part of a connection between the piston member 34 and the shift lever 18 of the transmission. A hollow valve member 40 is telescopically arranged relative to the piston rod 36 and is reciprocable relative to the piston member 34 and projects through the end wall 42 of the cylinder.

The hollow valve member 40 forms a fluid flow passage between chamber 44 and the interior of the cylinder 32, and to this end is provided with one or more ports 46 which communicate with the chamber 44 and one or more ports 48 which are adapted to be brought into communication with the cylinder 32 on either side of the piston member 34. As shown in Fig. 2, however, the ports 48 are closed by a valve closure member 50. The chamber 44 may be formed as illustrated by a tubular projection 52 formed integrally with the end wall 42 of the cylinder 32. The valve member 40 projects through a seal 54 arranged in a recess in the wall 42 and separates the cylinder 32 from the chamber 44. The right-hand end of the valve is connected by means of a two-part clamping ring 56 with a cable 58 which extends through a tube 60, the cable 58 and tube 60 forming the positive two-way connection 30 between the valve member 40 of the power unit and the control 26.

One end of the tubing is secured by a nut 62 to a threaded boss on a cap 64 which is threadedly secured to the end of the projection 52. The cable 58 extends freely through the tube 60 and is connected to the valve member 40 by the clamping member 56 so that movement of the cable 58 will effect a corresponding movement of the valve member 40. The cap 64 by engagement with the clamping member 56 determines one limit position of the valve 40, and engagement of the clamp 56 with the shoulder 66 determines the other limit position of the valve 40. A seal 68 carried by the clamping member 56 cooperates with the interior of the projection 52 so as to prevent the leakage of air into the chamber 44, while the seal 54 forms a seal which prevents leakage between the cylinder 32 and the chamber 44.

A conduit 70 connected to the projection 52 forms the suction communication 22 between the chamber 44 and the intake manifold 24 so that the manifold pressure will prevail in the chamber 44. The chamber 44 is that part of the projection 52 between the seals 54 and 68. Since the port 46 in the valve 40 is always exposed to the chamber 44, the interior passage in the valve 40 will always be subject to the suction pressures in the manifold.

The valve closure member 50 is carried by and movable with the piston member 34 relative to the hollow valve member 40 and cooperates with the hollow valve member to close the ports 48 therein. The hollow valve member 40 is shiftable relative to the piston member 34 and movable between limit positions spaced a distance at least as great as the stroke of the piston member 34 relative to the cylinder 32. The valve closure member 50 is secured in a recess in a nut 72 by a ring 74. The valve closure member 50, however, is free to shift transversely of the recess so as to facilitate alignment between the hole 76 therethrough and the valve member 40 which projects through such hole. An annular sealing ring 51 is arranged between the left-hand side of the valve closure member 50 and the bottom of the recess in the nut 72. There is a close sliding fit between the valve member 40 and the valve closure member 50 so that when such parts are positioned relative to each other as shown in Fig. 2, the member 50 will close the ports 48 in the valve member 40 which will prevent the porting of suction to the cylinder 32 on either side of the piston 34. The nut 72 is threadedly secured to one end of the piston rod 36 and clamps the same to the piston member 34.

The piston rod 36 is hollow and forms a passage 80 which communicates with the cylinder 32 on one side of the piston member 34 through ports 82. A restricted orifice 84 forms a restricted bleed through the wall 42 between the cylinder 32 and atmosphere, a filter 86 being provided to prevent the entry of dirt into the cylinder 32 through the bleed 84.

With the parts arranged as shown in Fig. 2, movement of the valve member 40 to the left relative to the valve closure member 50 will expose the ports 48 to the passage 80, thereby porting the side A of cylinder 32 through ports 82 to suction (assuming the engine 12 is operating), whereupon the piston 34 will move toward the left and until the valve closure member 50 again closes the ports 48, the bleed 84 at this time bleeding atmosphere into the side B of the cylinder. The speed of movement of the piston 34 will depend upon the pressure differential between sides A and B of the cylinder which will be determined to some extent by the size of the orifice 84.

If we assume that the piston member 40 moves to its left-hand limit position, the piston member 34 will follow and move to the position shown in dotted lines, which will effect a shifting of the transmission from reverse through neutral into forward gear.

A seal 90 arranged in a recess in the wall 38 forms a seal between the opening in the wall 38 through which the rod 36 extends and the piston rod. Exteriorly of the cylinder 32 the piston rod has mounted thereon a valve 92 which comprises bushing 94 and body part 96 which cooperate to form chambers C and D (Fig. 3). Chamber D communicates with atmosphere through orifice 98 and filter 100. Valve member 102 is slidably arranged in the valve body 96 and forms a partition between chambers C and D. However, chambers C and D are in communication with each other by means of slots 104 in the valve member 102.

The end of the piston rod within the chamber C is provided with a valve seat 106 in the form of an annular ring of resilient material against which the face 108 of the valve member 102 is adapted to seat. A spring 110 confined between the valve member 102 and the body part 96 biases the valve member 102 toward its seat on the valve seat 106. The valve member, however, is provided with a restricted duct 112 which extends between one of the slots 104 and the face 108 so that when the valve member 102 is seated, there is a restricted communication between the chambers C and D and the passage 80 interiorly of the power piston rod 36. This forms a restricted communication between the atmosphere and chamber A of the cylinder 32 through passage 80 and port 82. The size of the restricted communication afforded by the duct 112 is not sufficient to prevent the porting of suction to the chamber A to move the piston member 34 to its forward gear position.

The valve member 102 is mounted on a stem 114 which is connected to a yoke 116, which in turn is connected to shift lever 18 by bolt 120. As shown in Fig. 2, the valve member 102 is seated on the valve seat 106 on the end of the piston rod 36 so that when the valve 40 is moved to port chamber A of cylinder 32 to suction, the piston 34 will through piston rod 36, valve 102, stem 114 and yoke 116 positively move the lever 18 through the neutral to the forward gear position thereof, and the speed of movement as previously explained will be determined by the pressure differential existing between the chambers A and B.

If the valve 40 is moved to its leftmost position, the piston 34 will move to the dotted line position, and as previously indicated the valve closure 50 will close the ports 48 in the valve 40 so as to discontinue the porting of suction to the chamber A which now comprises a very small clearance between the end wall 38 and the piston 34 in the dotted line position thereof. With the piston 34 in the dotted line position shown in Fig. 2, movement of the valve 40 to the right will port the chamber B of the cylinder to suction, which will cause the piston 34 to move to the right. The size of the bleed 84 is not such as to prevent the suction applied to the chamber B from moving the piston member 34 to the right.

Upon movement of the piston 34 to the right, the valve seat 106 will move away from the face 108 of the valve member 102, thereby providing a relatively unrestricted communication between atmosphere and the chamber A through slots 104, chamber C, passage 80, and ports 82. This porting of the chamber A to atmosphere will result in a relatively quick movement of the piston member 34 to the right. Since the valve 102 can only move a short distance relative to the body 96, the body 96 will by reacting through the spring 110 cause the valve 102 to follow the piston rod 36, thereby to shift the lever 18 of the transmission from its forward to its neutral or reverse position, depending upon the extent of movement of the valve 40. If the valve 40 is moved so that the ports 48 thereof are approximately midway between the ends of the cylinder 32, the shift lever will be shifted to its neutral position, and if the ports 48 are returned to their position as illustrated in Fig. 2, the shift lever 18 will be restored to its reverse position.

The spring 110 will cause the face 108 of the valve member 102 to seat on the seat 106 after the piston 34 stops moving, and when the piston 34 stops moving toward the right the valve member 50 will be in position to close the ports 48 as shown in Fig. 2.

The control 26 includes a lever 124 which is connected to a rotary disk or cylinder 126 which is rotatably mounted in casing 128. The tube 60 is secured to the casing, and the cable 58 projects from the end of the tube into the casing and is coiled partly around the disk 126 and suitably secured thereto. The casing 128 is provided with legends to indicate the reverse, neutral and forward positions for the lever 124. When the lever 124 is shifted from the reverse position in which it is shown in full lines in Fig. 6 to the neutral position indicated by the letter N, the cable 58 will transmit sufficient motion to the valve member 40 to position the ports 48 approximately midway between the cylinder end walls 38 and 42, whereupon if the torque on the gearing of the transmission has been released by closing of the engine throttle, the piston member 34 will be energized to shift the transmission from reverse to neutral position. Movement of the lever 124 to the forward position indicated by the legend F will shift the valve 40 so as to cause the piston member 34 to move sufficient to shift the lever 18 to the forward position of the transmission.

The cable 58 provides a positive two-way connection between the lever 124 and the valve member 40 so that the valve member 40 will move with movement of the lever 124. There is no force opposing the movement of the lever 124 except the friction of the disk 126, the cable 58 and the valve 40 so that very little effort is required to shift the lever 124 between the various positions thereof. The valve member 40 may be moved to any of its positions without waiting for movement of the piston member 34. This permits the valve 40 to move ahead of the piston 34 and makes it possible for the operator of the craft by manipulating the lever 124 to shift the transmission into and out of forward and reverse gear very expeditiously when it is desired to maneuver the craft in close quarters.

In the embodiment illustrated in Fig. 5 there is shown a valve 192 which is adapted when open to provide a relatively unrestricted communication between atmosphere and either chamber A or B. When using this valve 192 in lieu of the valve shown in Fig. 3, the bleed 84 is omitted. The piston rod 236, corresponding in function with the piston rod 36, has a valve member 202 threadedly secured to the end thereof for movement therewith. The valve member 202 is reciprocally arranged in its cylinder formed by valve housing 203. Valve member 202 is provided with a restricted duct 205 which affords a restricted communication between atmospheric port 206 and valve chamber E.

Valve member 202 is also provided with a restricted duct 207 which provides a restricted communication between atmospheric port 206 and valve chamber F. Chamber F is in communication through conduit 209 with chamber B of cylinder 32 eliminating the need for a bleed 84. A spring 210 is confined between valve member 202 and one end of the body of the valve 192, and another spring 211 is confined between the valve 202 and the other end of the valve body 203, the springs 210 and 211 centering the valve 202 relative to the atmospheric port 206 so that both chambers E and F are in communication with atmosphere through the respective ducts 205 and 207. Chamber E, of course, is in communication through passage 80 with chamber A of cylinder 32. In this case the valve body 203 is provided with stem 214 which is connected to the yoke 116, the piston rod 236 being connected to the piston 34 and otherwise the same as the piston rod 36.

As a matter of fact, the construction of this modification in other respects is the same as that shown in the other figures, the difference in the valve providing a porting of atmosphere to the cylinder 32 on each side of the piston 34.

When the piston rod 236 moves to the left in response to leftward movement of the piston 34, the valve 202 will move to the left so that atmospheric port 206 communicates directly with chamber F, thereby porting atmosphere through conduit 209 to chamber B of cylinder 32. Likewise, when piston rod 236 moves to the right in response to movement of the piston 34, the atmospheric port 206 is placed directly in communication with chamber E which is in communication through passage 80 with chamber A of cylinder 32, thereby porting chamber A directly to atmosphere. With this arrangement the piston 34 can move relatively quickly in both directions since the atmospheric porting will offer no appreciable resistance to movement of the piston 34. The ducts 205 and 207 are restricted so that they will not prevent the porting of suction to the chambers A and B from effecting movement of the piston 34.

The operation of the modification as shown in Fig. 5 is the same as that shown in the previous figures, except that in the case of Fig. 5 relatively quick movement of the piston will be obtained in both directions, whereas in the case of the other figures relatively quick movement will be obtained when the shift is made from forward to reverse but not vice versa.

This application is a continuation-in-part of my copending application Serial No. 74,050, filed February 2, 1949, for Pressure Actuated Transmission Control Unit, in which application certain subject matter disclosed herein is specifically claimed.

While I have illustrated and described preferred embodiments of my invention, it is understood that these are capable of modification and I therefore do not wish to be limited to the precise details set forth but desire to avail myself of such changes and alterations as fall within the purview of the following claims.

I claim:

1. A power unit comprising a cylinder, a piston member reciprocally arranged in said cylinder and separating the space in said cylinder on one side of said piston member from the space on the other side thereof, a hollow piston rod secured to said piston member and projecting through an end wall of said cylinder, a hollow valve member telescopically arranged relative to said piston rod and projecting through the opposite end wall of said cylinder, said hollow valve member forming a fluid flow passage, said passage being provided with a fluid port on the end of the valve member disposed within said cylinder and said passage having a fluid pressure connection thereto exteriorly of said cylinder, a valve closure member carried by and movable with said piston member relative to said hollow valve member and cooperable with said hollow valve member to close said port therein, said hollow valve member being freely shiftable in both directions relative to said valve closure member so as to uncover said port on either side of said valve closure member and said piston member thereby to establish communication between said cylinder and said passage on a selected side of said piston member, said hollow valve member being movable relative to said piston member a distance at least as great as the stroke of said piston member relative to said cylinder, the end of said hollow piston rod remote from said cylinder forming part of a normally closed valve means constructed and arranged to be opened during movement of said hollow piston rod toward one end of said cylinder for admitting fluid into said cylinder on the side of said piston member remote from said one end of said cylinder.

2. A power unit comprising a cylinder, a piston member reciprocally arranged in said cylinder and including a hollow piston rod projecting through one end wall of said cylinder, a hollow valve member reciprocally arranged relative to said piston rod, said hollow valve member having substantially the same extent of movement relative to said piston member as said piston member has relative to said cylinder, said hollow valve member forming a fluid flow passage, said passage being provided with a fluid port on one end thereof and said passage having a suction connection thereto at the other end thereof, a valve closure member carried by and movable with said piston member relative to said hollow valve member and cooperable with said hollow valve member to close said port therein, said hollow valve member being freely shiftable in one direction relative to said valve closure member so as to uncover said port on one side of said valve closure member and said piston member thereby to establish communication between said cylinder and said passage on said one side of said piston member, means operable for shifting said hollow valve member relative to said piston member and valve closure member so as to effect the application of suction to said cylinder on said one side of said piston member whereby said piston member and rod will move relative to said cylinder toward said port, and normally closed valve means associated with the end of said piston rod remote from said cylinder and constructed and arranged to open during movement of said piston member and rod in said one direction for admitting atmosphere into said cylinder on the opposite side of said piston member.

3. A power unit comprising a cylinder, a piston member arranged in said cylinder for reciprocal movement relative thereto between limit positions at each end of said cylinder, a piston rod secured to said piston member and projecting through an end wall of said cylinder, a hollow valve member reciprocally arranged relative to said piston member and projecting through the opposite end wall of said cylinder, said hollow valve member forming a fluid flow passage, said passage being provided with a fluid port on the end of the valve member disposed within said cylinder and said passage having a suction connection thereto exteriorly of said cylinder, a valve closure member carried by and movable with said piston member relative to said hollow valve member and cooperable with said hollow valve member to close said port therein, said hollow valve member being shiftable relative to said piston member between limit positions spaced a distance at least as great as the stroke of said piston member, means operable for selectively positioning said hollow valve member in either of its limit positions or in any position intermediate its limit positions, postioning of said port of said hollow valve member on one side of said valve closure member uncovering said port and thereby applying suction to said cylinder on said one side of said piston member whereby said piston member and rod will move relative to said cylinder toward said port, said piston member and hollow valve member being constructed and arranged so as to be freely movable relative to each other so as to permit free movement of said hollow valve member by said positioning means from one of its limit positions to the other without thereby moving said piston member, and normally closed valve means associated with said piston rod and constructed and arranged to be opened upon movement of said piston rod for admitting air into said cylinder on the other side of said piston member.

4. A power unit comprising a cylinder member, a piston member arranged in said cylinder member for reciprocal movement relative thereto, a hollow piston rod secured to said piston member, a hollow tubular valve member reciprocally arranged relative to said piston member and telescopically arranged within said piston rod and provided with a fluid port, a fluid pressure connection with the interior of said valve member, said hollow piston rod forming a fluid flow passage and having a fluid port therein in communication with said cylinder on one side of said piston member, an annular valve closure member through which said hollow valve member extends, and carried by and movable with said piston member and piston rod relative to said hollow valve member and cooperable with said hollow valve member to close said port therein, means operable for shifting said hollow valve member relative to said valve closure member, positioning of said port of said hollow valve member on one side of said valve closure member uncovering said port and thereby causing the application of fluid pressure to said cylinder member on one side of said piston member whereby said piston member and rod will move relative to said cylinder member, and normally closed valve means associated with the end of said piston rod remote from said cylinder, said valve means comprising a valve member biased into engagement with said end of said piston rod so as to close said fluid flow passage therein, said piston rod being movable relative to said valve member in one direction of movement of said piston rod for opening said normally closed valve means for admitting pressure fluid to said cylinder member on the other side of said piston member through said piston rod and said fluid port therein.

5. A device according to claim 4 wherein said piston member and hollow valve member are constructed and arranged so as to be freely movable relative to each other so as to permit free movement of said hollow valve member by said shifting means from one of its limit positions to the other without thereby moving said piston member.

6. A power unit comprising a cylinder having a piston member arranged therein for reciprocal movement relative thereto between limit positions at each end of said cylinder, a hollow piston rod secured to said piston member, a hollow valve member reciprocally arranged relative to said piston member and being provided with a fluid port, a suction connection with the interior of said hollow valve member, an annular valve closure member through which said hollow valve member extends, carried by and movable with said piston rod relative to said hollow valve member and cooperable with said hollow valve member to close said port therein, said hollow valve member being shiftable relative to said piston member between limit positions spaced a distance at least as great as the stroke of said piston member, means operable for selectively positioning said hollow valve member in either of its limit positions or in any position intermediate its limit positions, positioning of said port in said hollow valve member on either side of said valve closure member uncovering said port and thereby porting suction to said cylinder on a selected side of said piston member whereby said piston member will move relative to said cylinder toward said port until said valve closure member closes said port, said piston member and hollow valve member being constructed and arranged so as to be freely movable relative to each other so as to permit free movement of said hollow valve member by said positioning means from one of its limit positions to the other without thereby moving said piston member, said hollow piston rod having a lost motion connection with a means to be actuated by said power unit in one direction of movement of said piston rod, said lost motion connection including a normally closed valve means constructed and arranged to be opened for admitting atmosphere to one end of said cylinder during movement of said piston rod in said one direction.

7. A power unit comprising a cylinder having a piston member reciprocally arranged therein and separating the space in said cylinder on one side of said piston member from the space on the other side thereof, a hollow piston rod secured to said piston member and projecting through an end wall of said cylinder, a hollow valve member telescopically arranged relative to said piston rod and projecting through the opposite end wall of said cylinder, said hollow valve member forming a fluid flow passage, said passage being provided with a fluid port on the end of the valve member disposed within said cylinder and said passage having a suction connection thereto exteriorly of said cylinder, an annular valve closure member through which said hollow valve member extends, carried by and movable with said piston member relative to said hollow valve member and cooperable with said hollow valve member to close said port therein, said hollow valve member being shiftable in one direction relative to said valve closure member so as to uncover said port on one side of said valve closure member and said piston member thereby to establish communication between said cylinder and said passage on said side of said piston member whereby said piston member will move in said one direction relative to said cylinder, said unit having normally closed valve means including a restricted atmospheric bleed port communicating with the interior of said hollow piston rod at the end thereof remote from said cylinder, said hollow piston rod communicating with said cylinder on the other side of said piston member, said valve means being constructed and arranged to be opened during movement of said piston rod and member in said one direction so as to provide a relatively unrestricted by-pass around said bleed port.

8. A device according to claim 7 wherein said bleed port restricts the communication between atmosphere and said cylinder when said valve is closed wherein said valve means provides a part of the connection between said piston rod and a means to be actuated by said power unit.

9. A power unit comprising a cylinder, a piston member reciprocally arranged in said cylinder, a piston rod secured to said piston member, a valve member reciprocally arranged relative to said piston member, said valve member being movable relative to said piston member to substantially the same extent as said piston member is movable relative to said cylinder, said valve member including a fluid port in communication with a source of suction, a valve closure member movable with said piston member relative to said valve member and cooperable with said valve member to close said port therein, said valve member being shiftable relative to said valve closure member so as to uncover said port on one side of said valve closure member and said piston member thereby to establish communication between said cylinder and said source of suction on one side of said piston member, means operable for shifting said valve member relative to said piston member and valve closure member so as to effect the application of suction to said cylinder on said one side of said piston member, said piston rod in one direction of movement thereof having a lost motion connection with a means to be actuated by said power unit, said lost motion connection including a normally closed valve constructed and arranged to be opened for admitting atmosphere to said cylinder on the opposite side of said piston member upon relative movement between said piston rod and said means to be actuated.

ROBLEY D. FAGEOL.

REFERENCES CITED

The following references are of record in the file of this patent:

UNITED STATES PATENTS

| Number | Name | Date |
| --- | --- | --- |
| 1,830,636 | Bragg et al. | Nov. 3, 1931 |
| 2,206,771 | Dugas, Jr. | July 2, 1940 |
| 2,258,908 | Price | Oct. 14, 1941 |
| 2,262,233 | Hey | Nov. 11, 1941 |